United States Patent
Tsunooka et al.

(10) Patent No.: US 7,110,246 B2
(45) Date of Patent: Sep. 19, 2006

(54) ELECTRONIC CONTROL UNIT CASE

(75) Inventors: Takao Tsunooka, Kariya (JP); Matsuhisa Tsuruta, Toyota (JP)

(73) Assignee: Advics Co., Ltd., Kariya (JP)

( * ) Notice: Subject to any disclaimer, the term of this patent is extended or adjusted under 35 U.S.C. 154(b) by 416 days.

(21) Appl. No.: 10/650,752

(22) Filed: Aug. 29, 2003

(65) Prior Publication Data

US 2006/0019521 A1    Jan. 26, 2006

(30) Foreign Application Priority Data

Sep. 3, 2002  (JP) ............................. 2002-258139
Jul. 23, 2003  (JP) ............................. 2003-278420

(51) Int. Cl.
H02B 1/20 (2006.01)
H05K 1/14 (2006.01)
H05K 5/04 (2006.01)

(52) U.S. Cl. ...................... 361/637; 361/736; 361/752

(58) Field of Classification Search ................ 361/719, 361/730, 796, 807, 810, 819; 303/119.1; 439/140

See application file for complete search history.

(56) References Cited

U.S. PATENT DOCUMENTS

| | | | |
|---|---|---|---|
| 5,040,853 A | | 8/1991 | Burgdorf et al. |
| 5,275,478 A | | 1/1994 | Schmitt et al. |
| 5,513,905 A | * | 5/1996 | Zeides et al. ............ 303/119.3 |
| 5,520,546 A | * | 5/1996 | Klinger et al. .............. 439/140 |
| 5,762,318 A | | 6/1998 | Staib et al. |
| 5,777,850 A | * | 7/1998 | Jakob et al. ................. 361/736 |
| 6,132,011 A | * | 10/2000 | Iwamura et al. ......... 303/116.4 |
| 6,155,856 A | * | 12/2000 | Sanada ........................ 439/246 |
| 6,164,732 A | | 12/2000 | Tominaga et al. |
| 6,388,885 B1 | | 5/2002 | Alexander et al. |
| 6,972,959 B1 | * | 12/2005 | Asai et al. ................... 361/719 |

* cited by examiner

Primary Examiner—Boris Chervinsky
(74) Attorney, Agent, or Firm—Buchanan Ingersoll PC

(57) ABSTRACT

An electronic control unit case is disclosed, wherein a coil is provided on the top surface of a block housing control equipment for operating the same. The case protrudes a sidewall from the circumferential part of a plate portion thereof in which a bus bar is embedded and is secured onto the block with the sidewall resting at its end surface on the block while covering the coil. An electronic control unit is attached to the back surface of the plate portion, a through hole is formed in the plate portion in correspondence to the coil, and a terminal of the coil and a terminal portion of the bus bar are joined to each other in the through hole. In a plane which is parallel to the axis of the coil as well as to a plane in which a portion embedded in the plate portion of the bus bar extends, the terminal portion of the bus bar is bent twice or the terminal portion of the bus bar and the coil terminal are bent both once so that a point where the terminal portion of the bus bar and the coil terminal are joined to each other is offset from the portion embedded in the plate portion of the bus bar in a direction parallel to the coil axis or is further offset from a root portion of the coil terminal in the same direction as the portion embedded in the plate portion of the bus bar extends. Further, the through hole is formed to extend math a thin width in the same direction as said portion embedded in said plate portion of said bus bar extends.

7 Claims, 7 Drawing Sheets

ELECTRONIC CONTROL UNIT CASE

INCORPORATION BY REFERENCE

This application is based on and claims priority under 35 U.S.C. sctn. 119 with respect to Japanese Applications No. 2002-258139 and No. 2003-278420 respectively filed on Sep. 3, 2002 and Jul. 23, 2003 the entire contents of which are incorporated herein by reference.

BACKGROUND OF THE INVENTION

1. Field of the Invention

The present invention relates to an electronic control unit case having one or more bus bars embedded therein to each of which the terminal of a coil for operating control equipment is connected.

2. Discussion of the Related Art

In a known electronically controlled pressure adjusting device, valve domes are protruded from the top surface of a valve block containing control valves, and a case which contains coils fit on the valve domes and to which an electronic control unit is attached is secured to the valve block. Bus bars for connecting the coils to the electronic control unit are embedded in the case in the form of multiple layers, and terminals of the coil are joined to the bus bars in through holes which are formed in the case in correspondence to the coils. U.S. Pat. No. 5,762,318 to Staib et al. describes the configuration that the terminal portion of each bus bar which is joined to the terminal of each coil is bent to meander in a plane perpendicular to the coil axis in order to absorb a displacement which acts on the coils when the case is fixed to the valve block with the coils being fit on the valve domes.

In the aforementioned prior art device, the terminal portion of each bus bar which is joined to the coil terminal in the through hole is bent to meander in the plane perpendicular to the coil axis, and such meander of the terminal portion causes the size of the through hole to be enlarged. Thus, the cross-section of the case which can be utilized to arrange the bus bars is undesirably decreased. For this reason, in the case that the number of the bus bars arranged is to be increased, the layers through which the bus bars are arranged must be increased in number, thereby enlarging the thickness of the case. This unfavorably results in failing to meet a recent requirement that electronic control units be miniaturized and lightened.

SUMMARY OF THE INVENTION

Accordingly, it is a primary object of the present invention to provide an improved electronic control unit case capable of increasing the number of bus bars arranged therethrough without being made thick or enlarged in size.

Another object of the present invention is to provide an improved electronic control unit case capable of certainly reducing the stress that a thermal load exerts on a juncture portion between a coil terminal and a bus bar.

Briefly, in an electronic control unit case according to the present invention, a coil is provided on the top surface of a block housing control equipment for operating the same. The unit case protrudes a sidewall from the circumferential part of a plate portion thereof in which a bus bar is embedded and is secured onto the block with the sidewall resting at its end surface on the block while covering the coil. The unit case is further provided with an electronic control unit attached to the back surface of the plate portion and is formed with a through hole in the plate portion in correspondence to the coil. A terminal of the coil and a terminal portion of the bus bar are joined to each other in the through hole. The terminal portion of the bus bar is bent at lest once in a plane which is parallel to the axis of the coil so that a bent portion of the bus bar constitutes a juncture portion joined to the coil terminal at a point which is offset from a portion embeded in the plate portion of the bus bar in at least a direction parallel to the axis of said coil. Further, the through hole is formed to extend with a thin width in the same direction as the portion embeded in the plate portion of the bus bar extends.

With this construction, since the terminal portion of the bus bar is bent at lest once in the plane which is parallel to the axis of the coil, the point where the bent or juncture portion of the bus bar is joined to the coil terminal can be offset from the portion embeded in the plate portion of the bus bar in at least a direction parallel to the axis of said coil. Thus, it becomes possible to make the through hole elongated with a thin width in the plane in which the bus bar is bent. This advantageously results in widening a section area or a possible layout extent in which one layer of the bus bars can be arranged, whereby the number of the bus bars arranged in one layer can be increased. Accordingly, the number of layers to be constituted in the plate portion can be reduced, and the plate portion and hence, the unit case can be made small in thickness, so that the unit case can be miniaturized and lightened.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Figure 1:
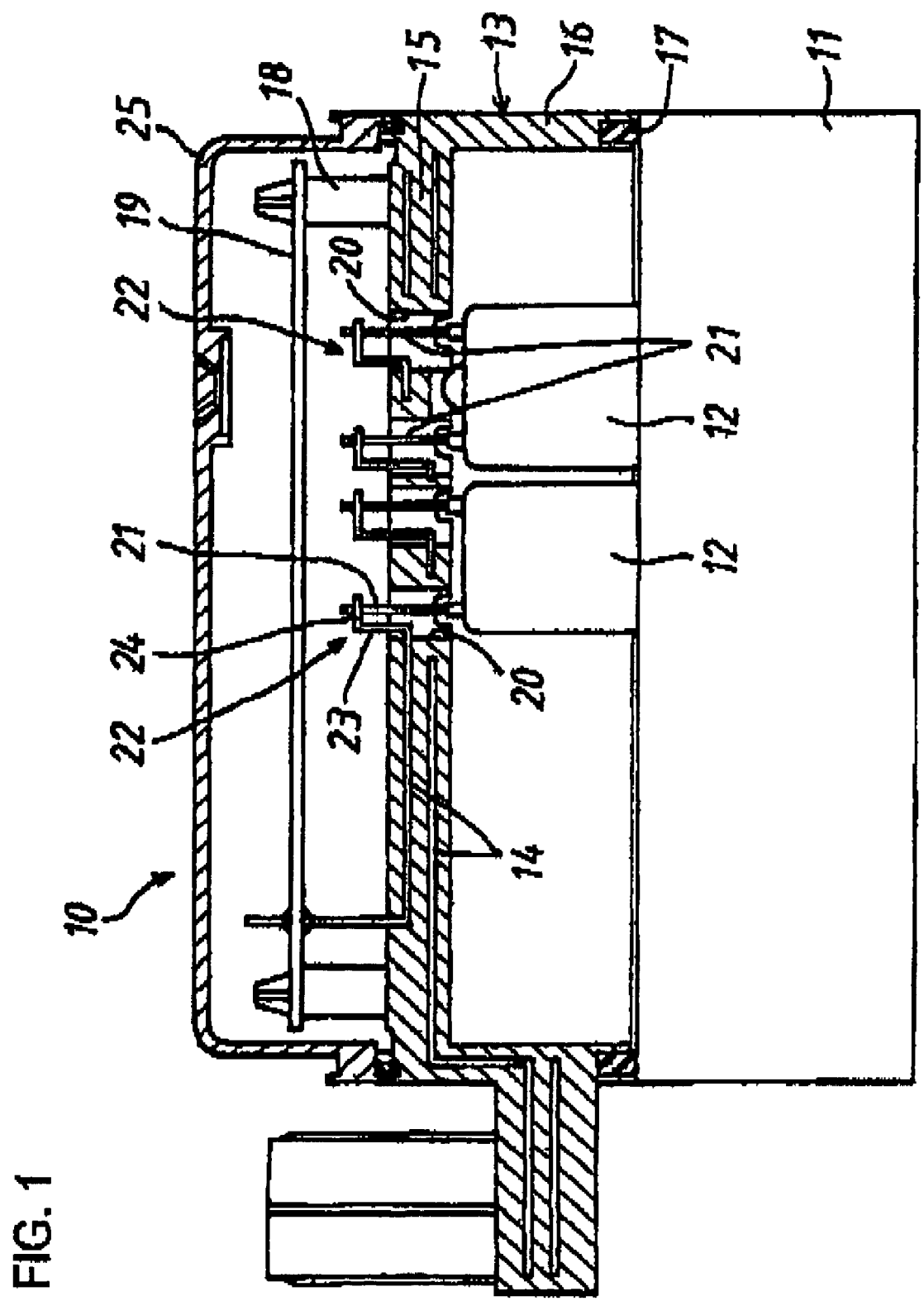
FIG. 1 is a front view partly in section of a pressure adjusting device incorporating a first embodiment of an electronic control unit case according to the present invention.
Figure 2:
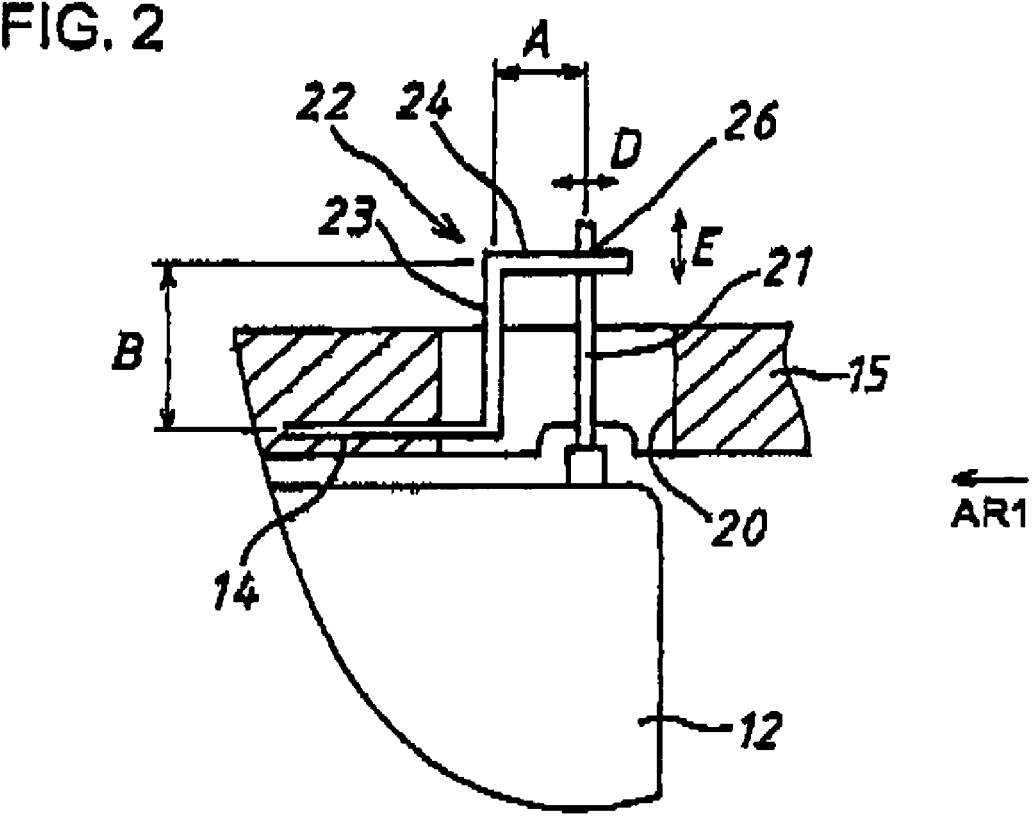
FIG. 2 is an enlarged fragmentary sectional view showing a juncture point between each coil terminal and each bus bar terminal.
Figure 3:
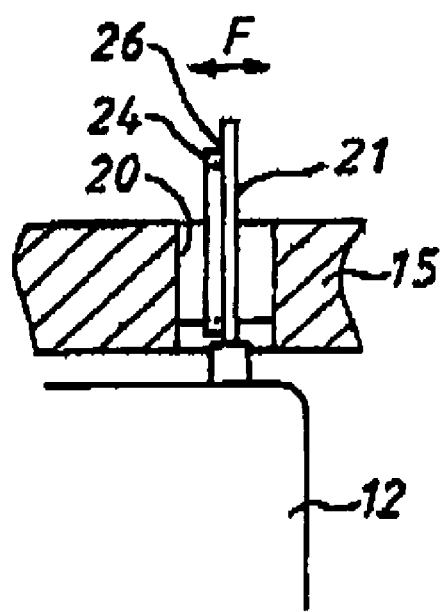
FIG. 3 is an enlarged fragmentary sectional view as viewed in the direction indicated by the arrow AR1 in FIG. 2.

Hereafter, a first embodiment of an electronic control unit chassis or case (hereafter as "unit case") 13 according to the present invention will be described with reference to FIGS. 1 to 3. The unit case 13 in the first embodiment is exemplified and illustrated in the form of being incorporated in a pressure adjusting device 10 for controlling the hydraulic pressure supplied to wheel cylinders in an anti-skid brake system for a vehicle. The pressure adjusting device 10 is composed of a valve block 11 provided therein with solenoid valves (not shown) for controlling the hydraulic pressures supplied to the wheel cylinders and an electronic control unit 19 attached to the unit case 13 which is secured or fixed to the valve block 11. In the valve block 11, there is contained control equipment such as valve sections of the solenoid valves, and several housings (two only shown in this particular embodiment) respectively containing coils 12 therein are fixed by caulking on the top surface of the valve block 11. The valve sections can be operated by the coils 12 respectively.

The unit case 13 made of a resin is formed with a plate portion 15 extending in parallel with the top surface of the valve block 11. Plural bus bars 14 are embedded in the plate portion 15 in the form of multiple or two layers parallel with the top surface of the block 11, and a sidewall 16 is formed at the circumferential edge portion of the plate portion 15 to be protruded downward therefrom. The unit case 13 is secured by means of one or more bolts (not shown) on the valve block 11 with the sidewall 16 resting at its end surface on the circumferential edge portion of the top surface of the block 11. A numeral 17 denotes a waterproof packing fit in an annular groove, which is formed on the end surface of the sidewall 16 to run along the center of the same. The waterproof packing is pressured on the top surface of the valve block 11 to keep a space containing the coils 12 waterproofed. Plural support posts or pillars 18 are protruded from the back or upper surface of the plate portion 15, and a circuit board 19 constituting the electronic control unit is secured by being snap-fit on the end portions of the support pillars 18.

Plural through holes 20 are formed in the plate portion 15 in correspondence to the coils 12, wherein two holes 20 correspond to one coil 12, and coil terminals 21 and terminal portions 22 of the bus bar 14 are joined to each other on a one-to-one basis in the through holes 20. More specifically, as bet shown in FIGS. 2 and 3, each of the coil terminals 21 extends in parallel with the axis of each coil 12, while each terminal portion 22 of the bus bar 14 are bent twice in a plane parallel to a primary layout direction in which the plural bus bars 14 are arranged or embedded in the plate portion 15. To be more exact, each terminal portion 22 of the bus bar 14 is bent twice to make a right-angled turn by each bending, so that the free and portion 24 is made parallel to the portion embeded in the plate portion 15 of each bus bar 14. Thus, each terminal portion 22 is constituted by an extension portion 23 extending spaced from the coil terminal 21 in parallel with the coil axis in the through hole 20 and the free end or juncture portion 24 extending perpendicular to the coil axis and held joined to the coil terminal 21. Each through hole 20 is formed to be thin in its width in the direction perpendicular to the plane in which each bus bar 14 is bent and is elongated in the primary layout direction that is parallel to those portions embeded in the plate portion 15 of the bus bars 14.

With this arrangement, the through holes 20 are made thin in a direction perpendicular to the primary layout direction in which the plural bus bars 14 are arranged, and the cross-section of each layer through which the bus bars 14 are arranged can be enlarged. This makes it possible to increase the number of the bus bars 14 which can be arranged in each layer. Accordingly, the plate portion 15 and hence, the unit case 13 can be made small in its thickness, so that the unit case can be made small in size and lightened.

The other ends of the bus bars 14 are bent to go out of the plate portion 15 and are connected by soldering to the circuit board 19. A numeral 25 designates a cover member covering the circuit board 19 and the like. The cover member 25 is secured by vibration welding to the back surface of the plate portion 15.

In assembling the pressure adjusting device 10, the housings of the coils 12 are first fixed by caulking on the top surface of the valve block 11, and the case 13 is then secured by means of bolts to the valve block 11 with the sidewall 16 resting at its end surface on the top surface of the valve block 11. Thereafter, the terminals 21 of the coils 12 and the terminal portions 22 of the bus bars 14 are welded and joined to each other. Thereafter, the circuit board 19 is snap-fit on the free ends of the support pillars 18 to be secured thereon, and the other ends of the bus bars 14 are joined by soldering to the circuit board 19. Finally, the cover member 25 is secured to the back surface of the plate portion 15 with the circuit boards 19 and the like being covered up thereby.

When the electronic control unit 19 (i.e., the circuit board) operates to apply an electric current through the bus bars 14, the terminal portions 22 and the coil terminals 21 to the coils 12, the solenoid valves (not shown) are operated to open and to supply the wheel cylinders with hydraulic-pressures. The pressure adjusting device 10 can be operated in a very wide range of temperature, wherein the case 13 made of a resin is different in the coefficient of linear expansion from the valve block 11 and the coils 12 both made of metals. Therefore, at a juncture point 26 between each terminal 21 of each coil 12 and each terminal portion of each bus bar 14, there is generated a stress caused by a thermal load in a horizontal direction (D), a vertical direction (E) and a separation direction (F), as indicated in FIGS. 2 and 3. However, at the terminal portion 22, the juncture point 26 is offset from each bus bar 14 or the portion thereof embeded in the plate portion 15 by the length (B) of the extension portion 23 in the lengthwise direction of the coil terminal 21 and by the length (A) between the extension portion 23 and the juncture point 26 in the direction perpendicular to the coil terminal 21. With this offset arrangement, each bus bar 14 and the coil terminal 21 joined thereto can be surely or certainly relieved of the aforementioned stress.

Figure 4:
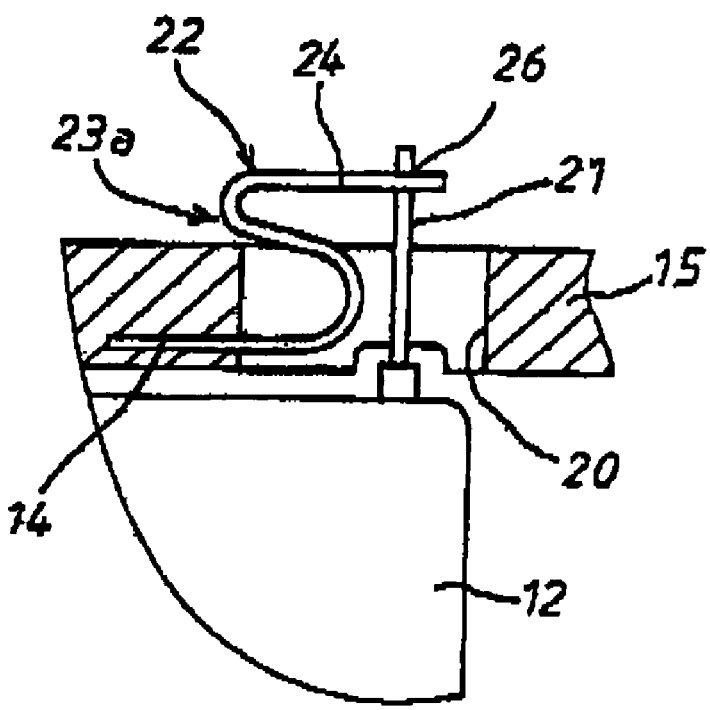
FIG. 4 is an enlarged fragmentary sectional view of a modification in which an extension portion in the first embodiment is made like an S-letter shape.

Although the extension portion 23 and the juncture portion 24 are formed to be straight in the aforementioned first embodiment, the extension portion 23a of the bus bar 14 may be bent like an S-letter shape in the plane in which the bus bar 14 is bent, as shown in FIG. 4 or may be bent more numbers of time than the bending number of the S-letter.

Figure 5:
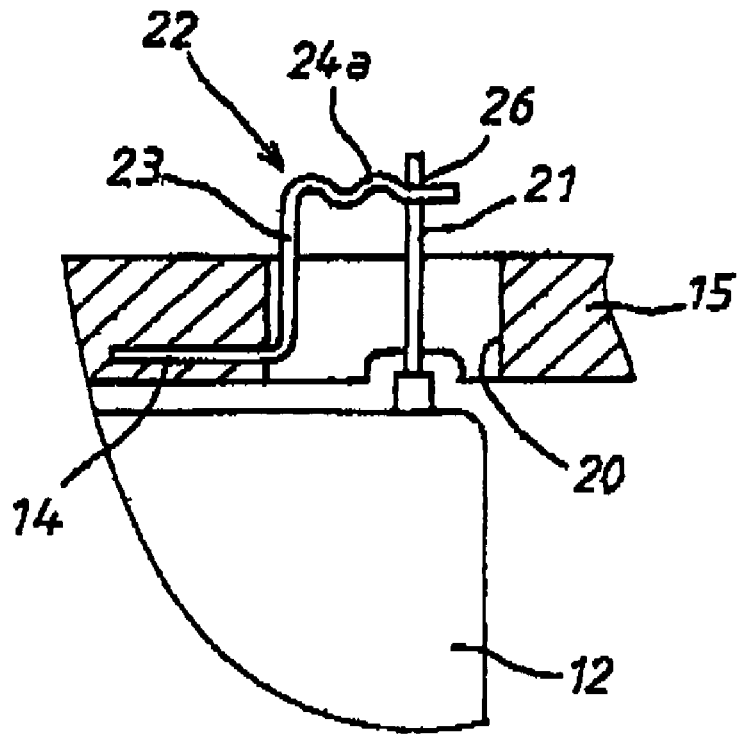
FIG. 5 is an enlarged fragmentary sectional view of another modification in which a juncture portion in the first embodiment is made like a waveform.
Figure 6:
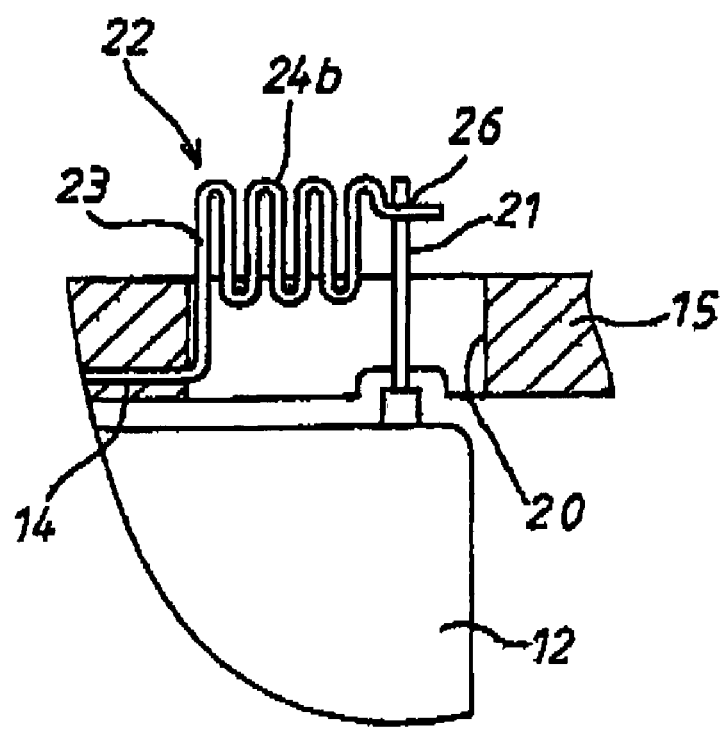
FIG. 6 is an enlarged fragmentary sectional view of still another modification in which the juncture portion in the first embodiment is made like a zigzag.

Also, as shown in FIG. 5, a juncture portion 24a of the bus bar 14 may be bent in a gentle waveform in the plane in which the bus bar 14 is bent, or as shown in FIG. 6, a juncture portion 24b of the bus bar 24 may be bent in a zigzag shape in which both ends of each straight portion thereof may be connected by circular arcs to the straight portions next thereto.

Figure 7:
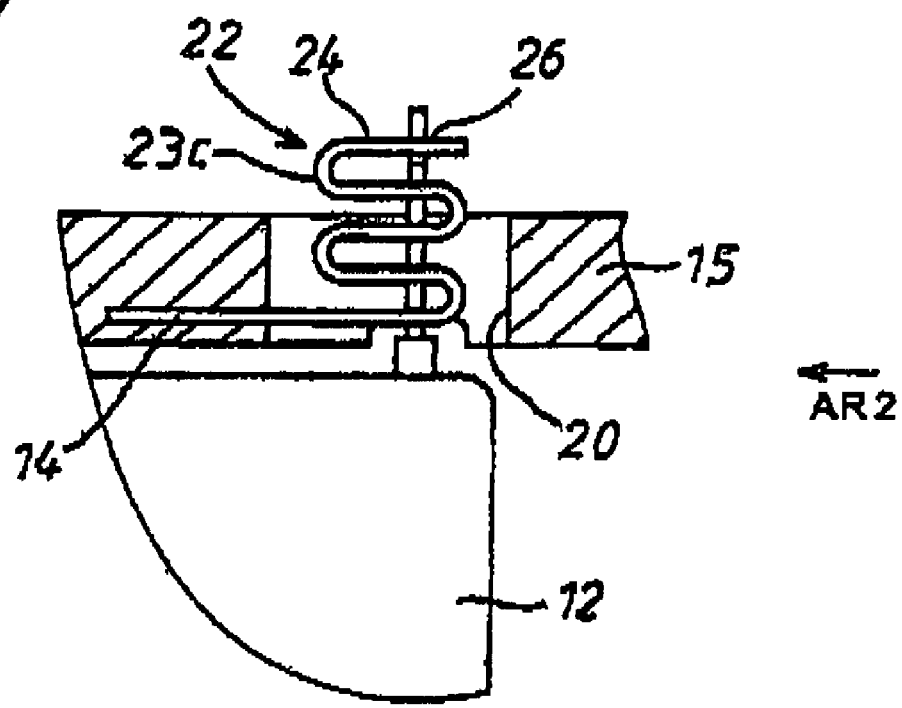
FIG. 7 is an enlarged fragmentary sectional view of a further modification in which the extension portion in the first embodiment is made like a zigzag.
Figure 8:
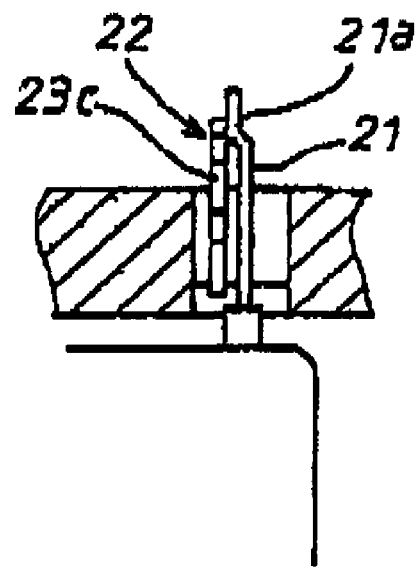
FIG. 8 is an enlarged fragmentary sectional view as viewed in the direction indicated by the arrow AR2 in FIG. 7.

Furthermore, as shown in FIG. 7, an extension portion 23c of the bus bar 24 may be bent in a zigzag shape in the plane in which the bus bar 24 is bent. In this modified case, the zigzag shape may be formed with left and right circular arcs thereof being located respectively at left and right sides of the coil terminal 21 so that it repetitively reciprocates across the coil terminal 21 towards the left and the right. In order for the zigzag portion of the extension portion 23c not to interfere with the coil terminal 21, an upper end portion 21a of the coil terminal 21 to which the juncture portion 24 Is welded may be offset slightly in a direction coming close to the extension portion 23, as best illustrated in FIG. 8.

By bending the extension portion 23 and the juncture portion 24 as described above, expansion and contraction are easily possible at the bent extension portion 23 and the bent juncture portion 24, so that the aforementioned stress caused by the thermal load can be further reduced.

In the foregoing first embodiment, the terminal portion of each bus bar 14 is bent twice to constitute the extension portion 23 and the juncture portion 24 and is joined to the corresponding coil terminal 21 at the free end of the juncture portion 24. This configuration advantageously provides a large allowance in the deformation of the terminal portion 22 caused by the aforementioned stress, and the stress can be absorbed through the deformation of the terminal portion 22, so that the coil terminal 21 can be prevented from being damaged.

The first embodiment takes the configuration of twice-bending for the aforementioned advantage or effect. However, in a modified form of the embodiment, the terminal portion of each bus bar 14 may bent once to constitute the extension portion 23, and then, the extension portion 23 may be curved to joined at its free end to the coil terminal 21.

Next, a second embodiment will be described with reference to FIGS. 9 and 10 as to the differences from the aforementioned first embodiment. In the second embodiment, each terminal 21 of the coil 12 is bent in a plane parallel to the axis of the coil 12, so that it constitutes a remaining portion 27 which remains extending in the coil axis direction in the through hole 20 and a bent portion 28 which extends in a direction perpendicular to the coil axis. The terminal portion of the bus bar 14 is extended across the remaining portion 27 in a plane perpendicular to the coil axis and is bent at a point apart by a distance (A) from the remaining portion 27 in a plane parallel with the plane in which the coil terminal is bent, thereby constitute an extension portion 29. The extension portion 29 of the bus bar 14 is extended in parallel with the remaining portion 27 of the coil terminal 21 in the through hole 20 and is joined to the bent portion 28 of the coil terminal 21 at a juncture point 26 offset by the distance (A) from the remaining portion 27. Thus, the juncture point 26 between the bent portion 28 of the coil terminal 21 and the extension portion 29 of the bus bar 14 is offset to be apart by the distance (A) from the remaining portion 27 and by a distance (B) from the embeded portion of the bus bar 14, so that the remaining portion 27 of the coil terminal 21 and the bus bar 14 can be surely or certainly relieved of the aforementioned stress.

That is, the juncture point 26 between the bent portion 28 and the extension portion 29 is offset from the both the embeded portion of the bus bar 14 and a root portion of the coil terminal 21 or the remaining portion 27. This configuration advantageously provides a large allowance in both the deformations of the coil terminal 21 and the terminal portion of the bus bar 14 caused by the aforementioned stress, and the stress can be absorbed to be shared by the coil terminal 21 and the terminal portion of the bus bar 14, so that both of the same can be prevented from being damaged.

Figure 9:
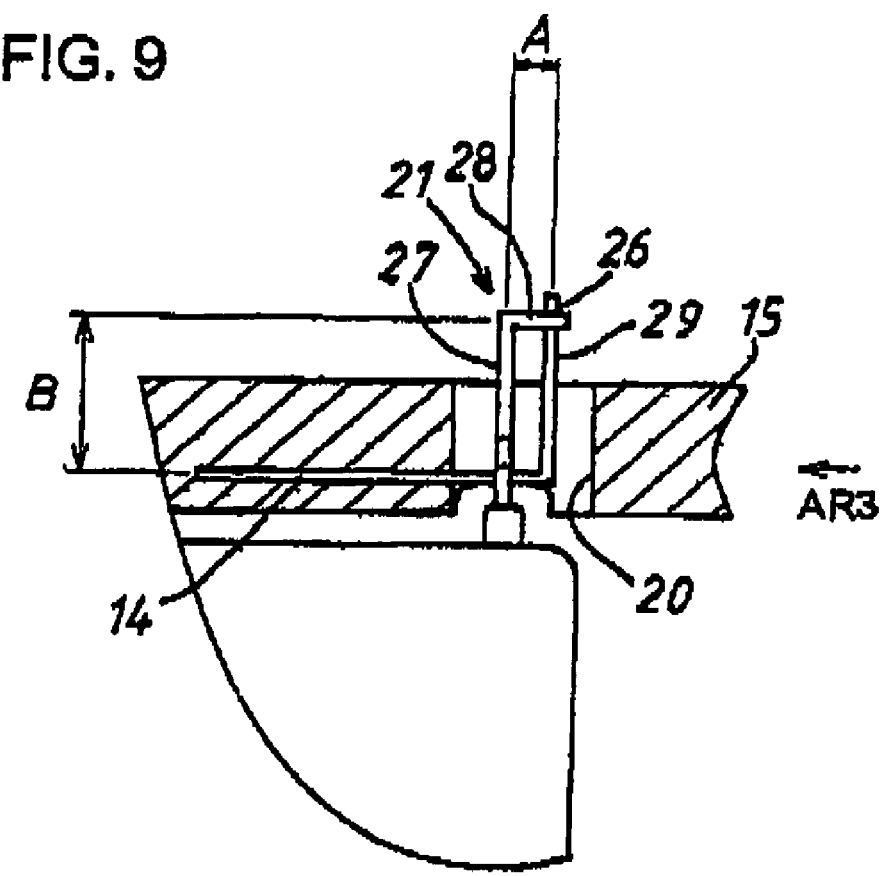
FIG. 9 is an enlarged fragmentary sectional view showing a juncture point between each coil terminal and each bus bar terminal in a second embodiment.
Figure 10:
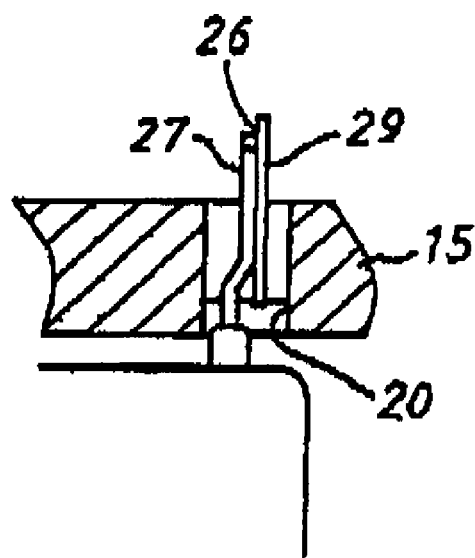
FIG. 10 is an enlarged fragmentary sectional view as viewed in the direction indicated by the arrow AR3 in FIG. 9.

As is clear from the comparison of the through hole 20 shown in FIG. 9 with that shown in FIG. 10, each through hole 20 is made to be elongated in the direction in which the bent portion 28 of the coil terminal 21 extends and to have a narrow width in a direction perpendicular to the elongated direction. Further, since the terminal portion of the bus bar 14 is extended across the remaining portion 27 in the plane perpendicular to the coil axis, it is preferable to avoid the interference of the bus bar 14 with the remaining portion 14, and therefore, the remaining portion 14 is offset slightly at its root portion, as shown in FIG. 10.

Figure 11:
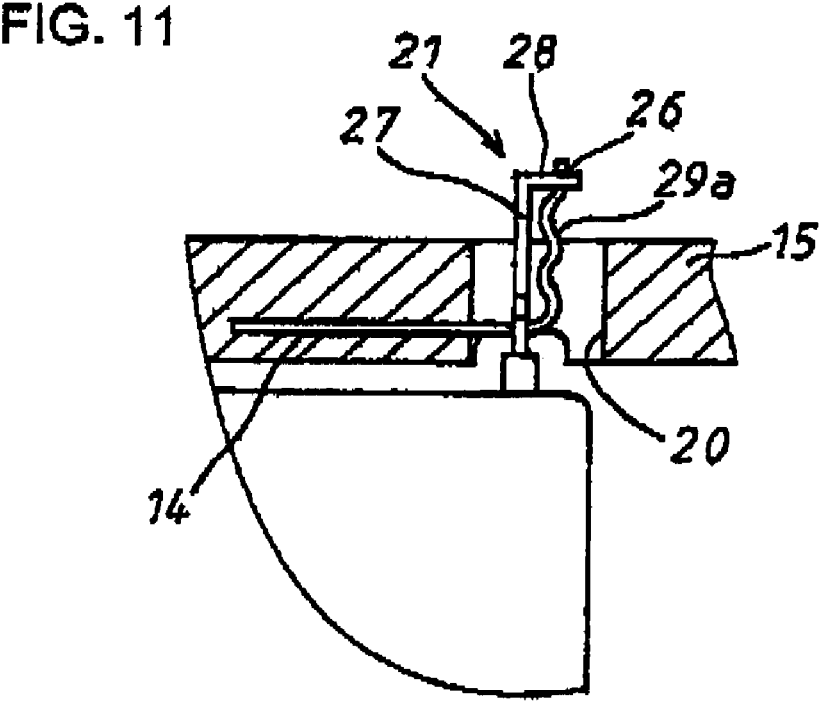
FIG. 11 is an enlarged fragmentary sectional view of a modification in which a contact portion in the second embodiment is made like a waveform.

Although the extension portion 29 of the bus bar 14 is made to be straight in the second embodiment, it may be bent like a waveform in the plane in which the bus bar 14 is bent, as indicated by a numeral 29a in FIG. 11. By bending the extension portion 29a like this, expansion and contraction are easily possible at the bent portion of the extension portion 29a, so that the aforementioned stress caused by the thermal load can be further reduced.

Figure 12:
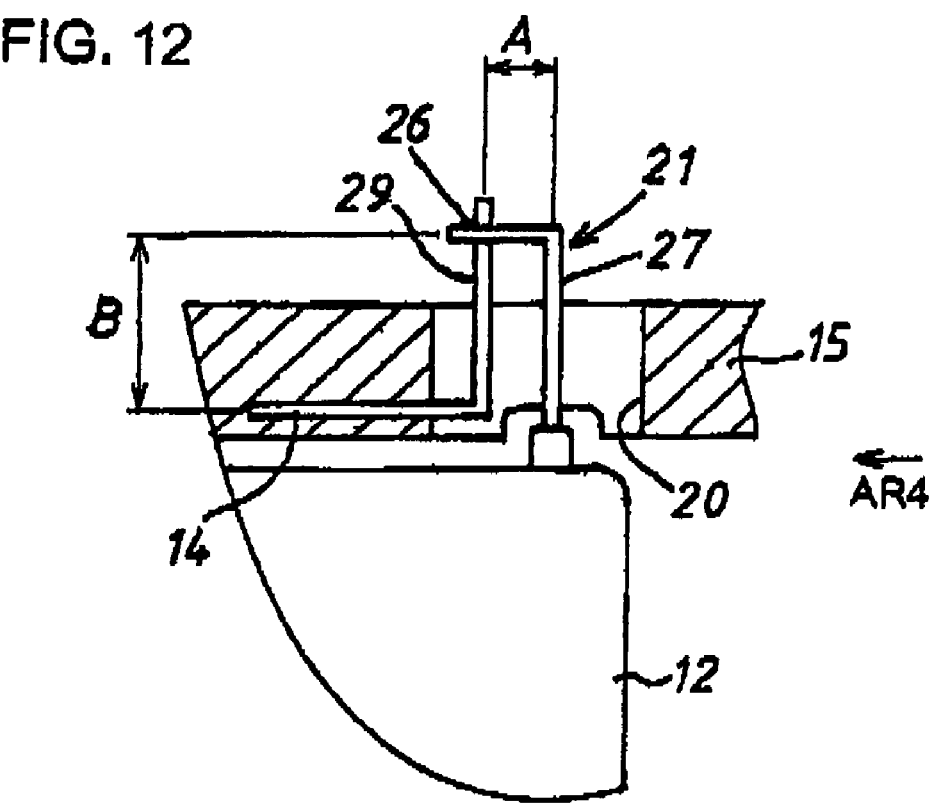
FIG. 12 is an enlarged fragmentary sectional view showing a juncture point between each coil terminal and each bus bar terminal in a third embodiment.
Figure 13:
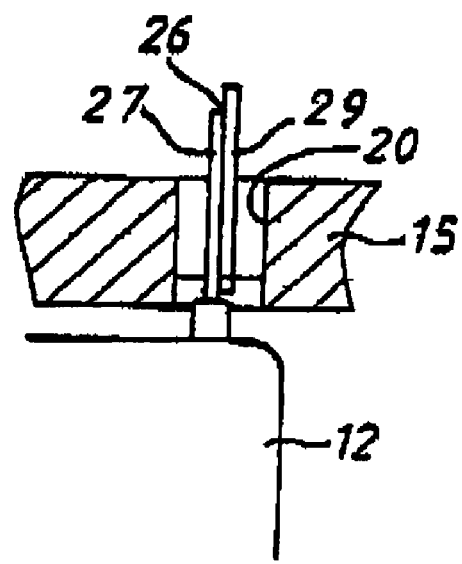
FIG. 13 is an enlarged fragmentary sectional view as viewed in the direction indicated by the arrow AR4 in FIG. 12.

A third embodiment show in FIGS. 12 and 13 is different from the aforementioned second embodiment in that each terminal 21 of the coils 12 is bent in a direction opposite to the direction in which it is bent in the second embodiment, in the plane extending in parallel to the coil axis, while the end portion of the bus bar 14 is bent, in a plane parallel to the plane in which the coil terminal 21 is bent, at a point before it would otherwise reach the remaining portion 27 in a plane perpendicular to the axis of the coils 12.

Although in the foregoing embodiments, the housings respectively containing the coils are fixed by caulking to the top surface of the valve block, they may be secured and held on the case. In this modified form, the case is fixed onto the valve block in such a way that each coil contained in a corresponding housing receives therein a core connected to a valve section end at the same time, is fit in a corresponding valve dome protruding from the valve block.

Obviously, numerous modifications and variations of the present invention are possible in light of the above teachings. It is therefore to be understood that within the scope of the appended claims, the present invention may be practiced otherwise than as specifically described herein.

What is claimed is:

1. An electronic control unit case attached to a block which houses control equipment, with a coil provided on a top surface of the block for operating the control equipment; the coil possessing an axis; the electronic control case covering the coil and comprising a plate portion in which a portion of a bus bar is embedded and a sidewall that protrudes from a circumferential part of said plate portion and rests on the block; wherein an electronic control unit is attached to a back surface of said plate portion; wherein a through hole is formed in said plate portion in correspondence to said coil; said coil possessing a coil terminal and said bus bar possessing a terminal portion;

said terminal portion of said bus bar being bent at least once in a plane parallel to the axis of said coil so that said terminal portion of said bus bar is spaced apart from said coil terminal in said through hole, the terminal portion of said bus bar possessing a free end forming a juncture portion that is joined to said coil terminal; and said through hole being narrower in a plane perpendicular to the plane in which the bus bar is bent than in the plane in which the bus bar is bent.

2. An electronic control unit case as set forth in claim 1, wherein:

said terminal portion comprises an extension portion that is parallel to the axis of said coil and said juncture portion extends in a direction perpendicular to the axis of said coil.

3. An electronic control unit case as set forth in claim 1, wherein said terminal portion of said bus bar is bent in a plane which is parallel to the axis of said coil as well as to a primary layout direction in which a plurality of bus bars including said bus bar are arranged to extend.

4. An electronic control unit case attached to a block which houses control equipment, with a coil provided on a top surface of the block for operating the control equipment; the coil possessing an axis; the electronic control case covering the coil and comprising a plate portion in which a portion of a bus bar is embedded and a sidewall that protrudes from a circumferential part of said plate portion and rests on the block; wherein an electronic control unit is attached to a back surface of said plate portion;
wherein a through hole is formed in said plate portion in correspondence to said coil; and wherein a terminal of said coil and a terminal portion of said bus bar are joined to each other;

said coil terminal is bent in a plane parallel to the axis of said coil so that said coil terminal comprises a remaining portion extending in said through hole parallel with the axis of said coil and a bent portion extending perpendicular to the axis of said coil;

said terminal portion of said bus bar is bent in a plane parallel to said plane in which said coil terminal is bent so that an extension portion of said terminal portion of said bus bar is spaced apart from said remaining portion in said through hole and a juncture portion of said terminal portion of said bus bar is joined to said bent portion of said coil terminal; and wherein said through hole is narrower in a plane perpendicular to the plane in which said coil terminal is bent than in the plane in which said coil terminal is bent.

5. An electronic control unit case as set forth in claim 4, wherein said terminal portion of said bus bar is bent in a plane which is parallel to the axis of said coil as well as to a primary layout direction in which a plurality of bus bars including said bus bar are arranged to extend.

6. An electronic control unit case attached to a block which houses control equipment, with a coil provided on a top surface of the block for operating the control equipment; the coil possessing an axis; the electronic control case covering the coil and comprising a plate portion in which a portion of a bus bar is embedded and a sidewall that protrudes from a circumferential part of said plate portion and rests on the block; wherein an electronic control unit is attached to a back surface of said plate portion; wherein a through hole is formed in said plate portion in correspondence to said coil; and wherein a terminal of said coil and a terminal portion of said bus bar are joined to each other;

said terminal portion of said bus bar is bent at least once in a plane parallel to the axis of said coil as well as to a plane in which the embedded portion of said bus bar extends so that a bent portion of said bus bar is joined to said coil terminal at a point which is offset from said embedded portion of said bus bar at least in a direction parallel to the axis of said coil; and said through hole has a narrower width in a direction perpendicular to the direction in which the embedded portion of the bus bar extends than in the direction in which the embedded portion extends.

7. An electronic control unit case attached to a block which houses control equipment, with a coil provided on a top surface of the block for operating the control equipment; the coil possessing an axis; the electronic control case covering the coil and comprising a plate portion in which a portion of a bus bar is embedded and a sidewall that protrudes from a circumferential part of said plate portion and rests on the block; wherein an electronic control unit is attached to a back surface of said plate portion; wherein a through hole is formed in said plate portion in correspondence to said coil; and wherein a terminal of said coil and a terminal portion of said bus bar are joined to each other;

said terminal portion of said bus bar extending into said through hole and said coil terminal are both bent at least once in a plane parallel to the axis of said coil as well as to a plane in which the embedded portion of the bus bar extends, wherein a bent portion of said bus bar is joined to a bent portion of said coil terminal at a point which is offset from said embeded portion of said bas bar in a direction parallel to the axis of said coil as well as from a root portion of said coil terminal in the same direction as said embedded portion of said bus bar extends; and said through hole possessing a narrower width in the direction perpendicular to the direction in which said embedded portion extends than in the direction in which said embedded portion extends.

* * * * *